(12) United States Patent
Pearce et al.

(10) Patent No.: US 7,086,521 B1
(45) Date of Patent: Aug. 8, 2006

(54) ADJUSTABLE LANE GUIDE

(75) Inventors: Thomas Pearce, Ruther Glen, VA (US); Eric Wyman, Austin, TX (US); Mark Manzi, Chesterfield, VA (US); Roland Lomerson, Jr., Bradenton, FL (US)

(73) Assignee: Bakery Holdings LLC, Richmond, VA (US)

( * ) Notice: Subject to any disclaimer, the term of this patent is extended or adjusted under 35 U.S.C. 154(b) by 45 days.

(21) Appl. No.: 10/997,297

(22) Filed: Nov. 24, 2004

(51) Int. Cl.
*B65G 47/26* (2006.01)
*B65G 21/20* (2006.01)
*B65G 15/00* (2006.01)
*B65G 17/00* (2006.01)

(52) U.S. Cl. .................. 198/456; 198/458; 198/436; 198/836.1; 198/836.3; 198/457.05

(58) Field of Classification Search ............... 198/456, 198/457.05, 436, 836.1, 836.3, 458
See application file for complete search history.

(56) References Cited

U.S. PATENT DOCUMENTS

| 1,505,220 | A | * | 8/1924 | Shay | 248/295.11 |
|---|---|---|---|---|---|
| 3,647,051 | A | * | 3/1972 | Didas | 198/836.3 |
| 5,035,384 | A | * | 7/1991 | Werthmann | 248/74.2 |
| 5,456,458 | A | * | 10/1995 | Haupenthal | 271/276 |
| 5,676,239 | A | * | 10/1997 | Mason | 198/836.1 |
| 6,622,352 | B1 | * | 9/2003 | Herron | 24/563 |

* cited by examiner

*Primary Examiner*—Gene O. Crawford
*Assistant Examiner*—Leslie A. Nicholson, III

(57) ABSTRACT

An adjustable lane guide system comprising: 1) first and second generally parallel and spaced apart support bars; 2) a plurality of lane guides generally perpendicular to the support bars; and 3) a plurality of adjustable attachment mechanisms joining the lane guides to the first and second support bars. Each of the adjustable attachment mechanisms comprises a bearing block that engages the support bars; a pair of opposing wings on either side of the bearing block also engaging the support bars and each having first and second ends, the first ends hingeably attached to the bearing block and the second ends flared by a spring located between the pair of opposed wings such that pressure applied to each of the second ends causes the wings to be drawn toward each other against the pressure of the spring thereby allowing the adjustment mechanisms to move laterally along the support bar so that the distance between adjacent lane guides can be changed along the first and second support bars.

5 Claims, 4 Drawing Sheets

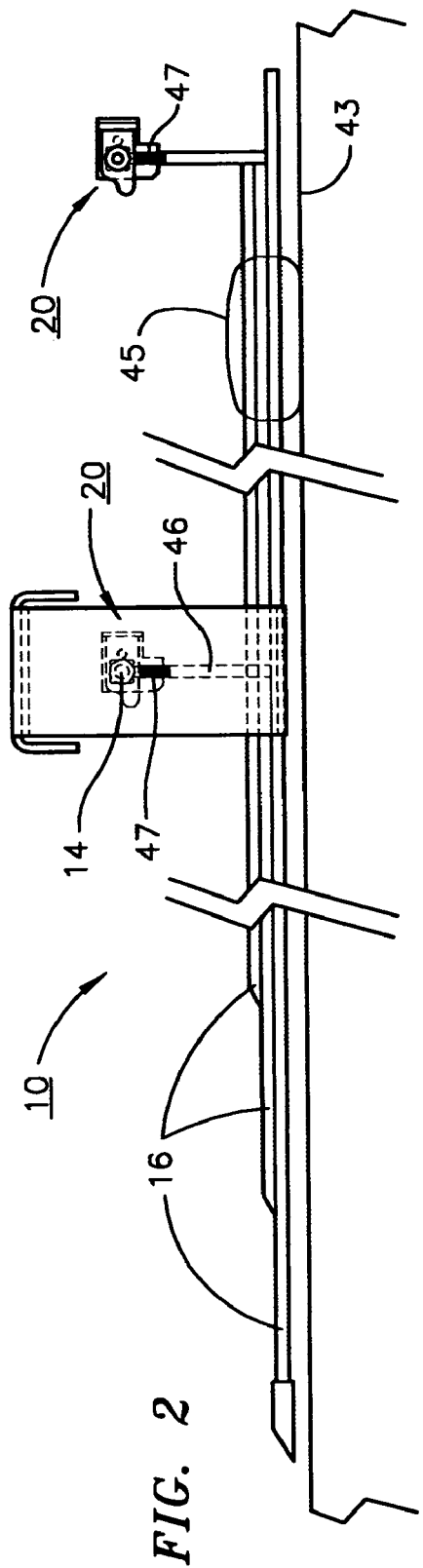
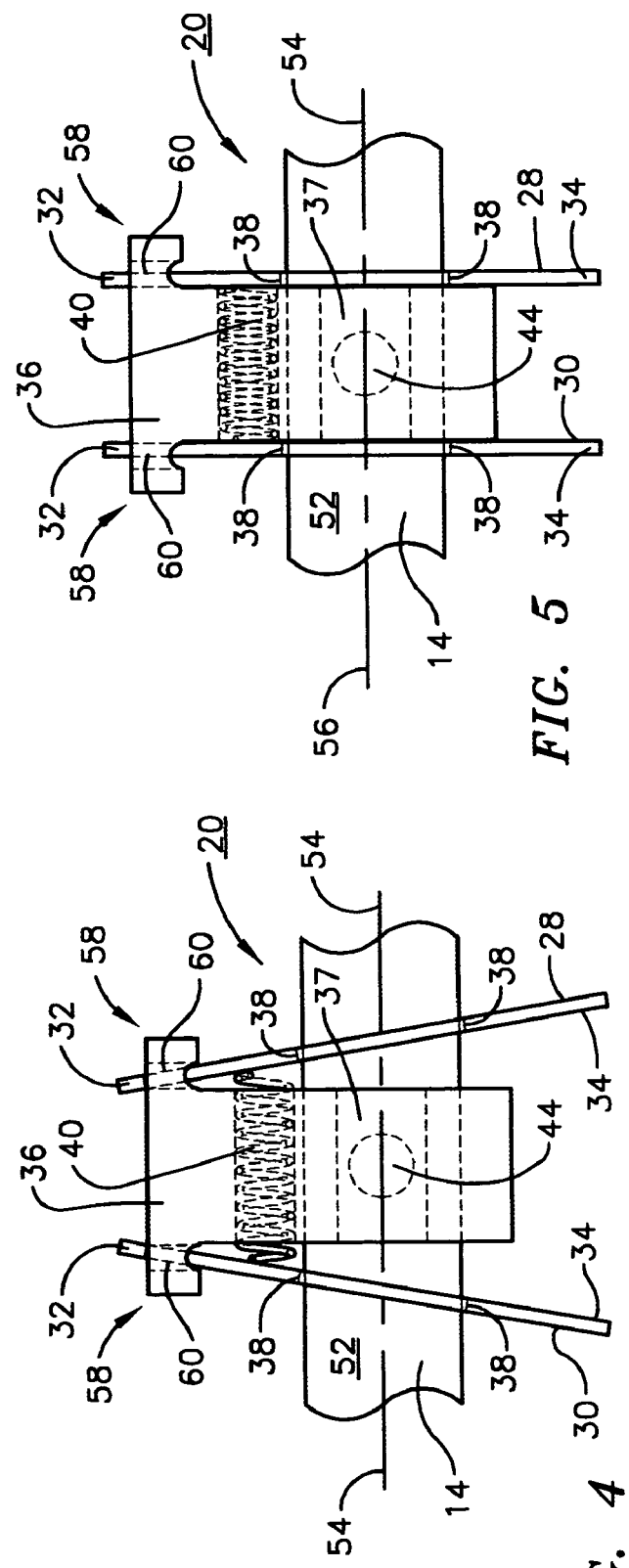

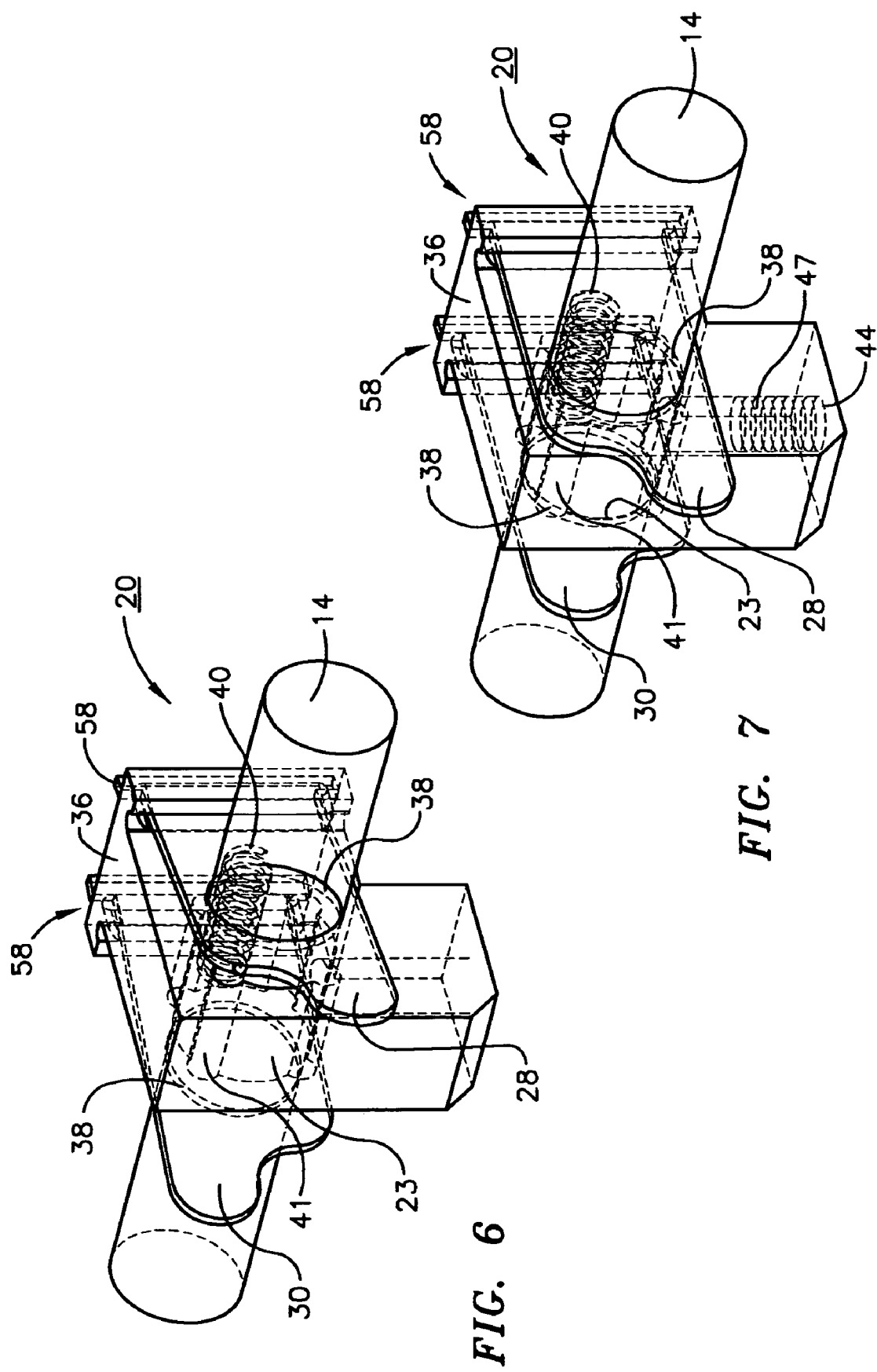

ADJUSTABLE LANE GUIDE

FIELD OF THE INVENTION

The present invention relates to devices for guiding continuously and unitarily processed products into a processing system and more particularly to an easily and readily adjustable processing lane guidance system.

BACKGROUND OF THE INVENTION

In the automated processing of unitary products through handling operations such as packaging or production operations, on, for example a conveyor belt or similar product moving system, it is generally necessary that the product units be guided into certain prescribed paths at one or more points in their movement. An example of such a situation is in the case of bakery products, for example buns, rolls, donuts etc. that are handled by automated systems particularly in the packaging operations.

In the prior art many such systems have been designed and utilized successfully. A major shortcoming of most such devices of the prior art, however, revolves about their adjustability or flexibility to accept different units of product or to alter the transfer location of the same product due to the time required to reset or readjust the movement lanes for a particular product or required product orientation in the automated line. Such prior art systems generally relied upon mechanical systems that involved the unfastening and fastening of a variety of devices such as screws, bolts etc. to accomplish the desired lane alterations or adjustments. Such mechanical adjustments often required the use of tool or tools to accomplish the desired lane reorientations. As is readily apparent to those skilled in this art, such adjustments can be time and labor consuming and result in downtime on the production machinery which translates into lost productivity and profits.

Accordingly, there continues to exist a need for a product lane adjustment system that allows for rapid and easy alteration of product movement lanes in automated product handling systems.

OBJECT OF THE INVENTION

It is therefore an object of the present invention to provide a lane guide adjustment system that is easy to use and allows for rapid lane modification or adjustment without the use of tools.

SUMMARY OF THE INVENTION

According to the present invention, there is provided an easily and readily adjustable lane guide system comprising: 1) first and second generally parallel and spaced apart support bars; 2) a plurality of lane guides generally perpendicular to the support bars; and 3) a plurality of adjustable attachment mechanisms joining the lane guides to the first and second support bars. Each of the adjustable attachment mechanisms comprises a bearing block that engages the support bars; a pair of opposing wings on either side of the bearing block also engaging the support bars and each having first and second ends, the first ends hingeably attached to the bearing block and the second ends flared by a spring located between the pair of opposed wings such that pressure applied to each of the second ends causes the wings to be drawn toward each other against the pressure of the spring thereby allowing the adjustment mechanisms to move laterally along the support bar so that the distance between adjacent lane guides can be changed along the first and second support bars. A conveyor system incorporating the adjustable lane guide system of the present invention is also described.

DESCRIPTION OF THE DRAWINGS

FIG. 2 is a partially phantom side view of the lane guide system of the present invention.

FIG. 4 is a partially phantom top view of a second lateral slideably adjustable attachment mechanism in accordance with the present invention in the locked position.

FIG. 5 is a partially phantom top view of a second lateral slideably adjustable attachment mechanism in accordance with the present invention in the moveable position.

FIG. 6 is a partially phantom isometric view of the second lateral slideably adjustable attachment mechanism in accordance with the present invention in the locked position.

FIG. 7 is a partially phantom isometric view of the second lateral slideably adjustable attachment mechanism in accordance with the present invention in the moveable position.

DETAILED DESCRIPTION

Figure 1:
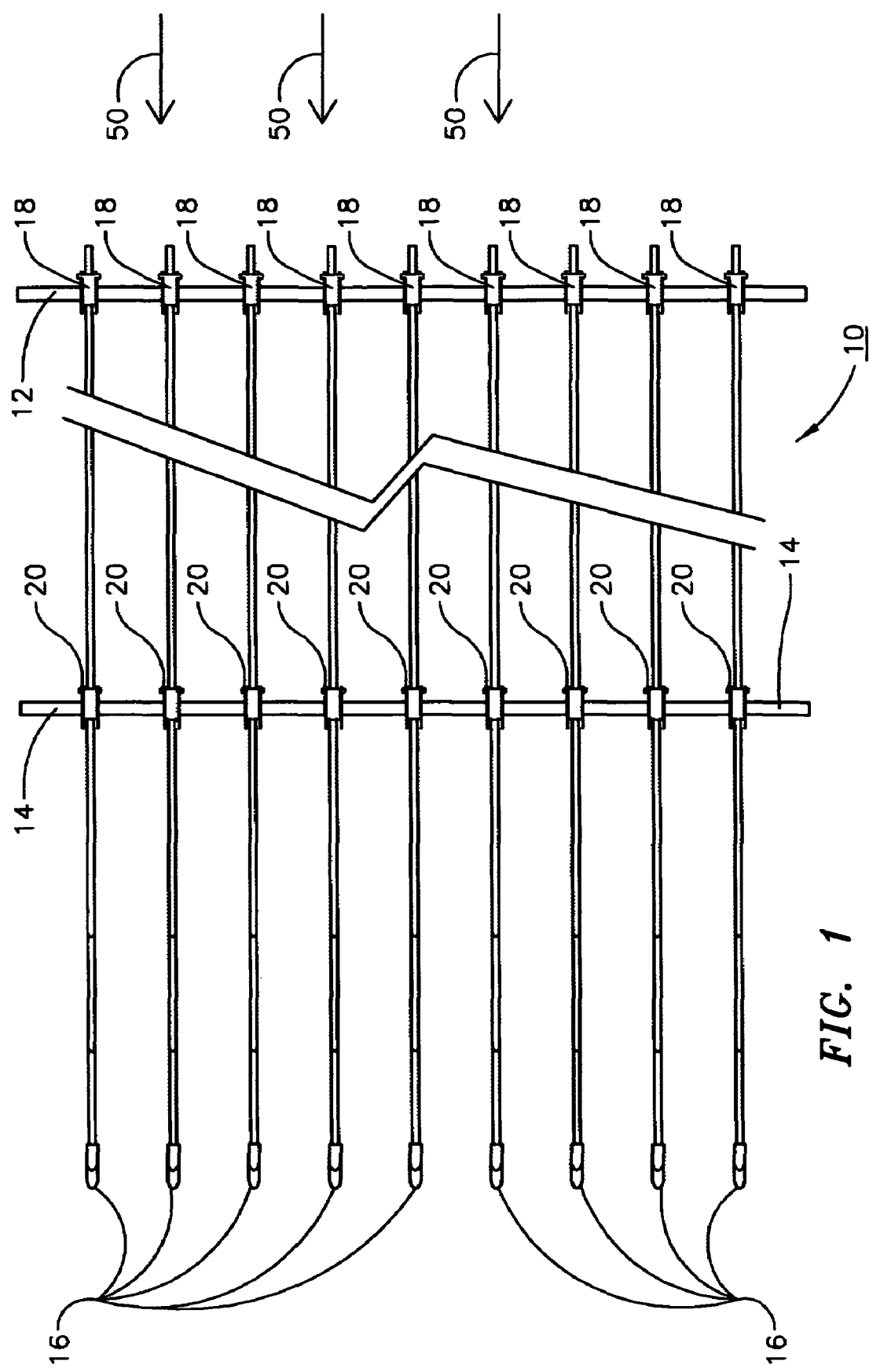
FIG. 1 is a partially phantom top plan view of the lane guide system of the present invention.

Referring now to FIG. 1, the lane guide system 10 of the present invention comprises: first and second support bars 12 and 14; a plurality of lane guides 16 of any suitable number; and slideable adjustment mechanisms 20, one on each of support bars 12 and 14 for each of lane guides 16.

Figure 3:
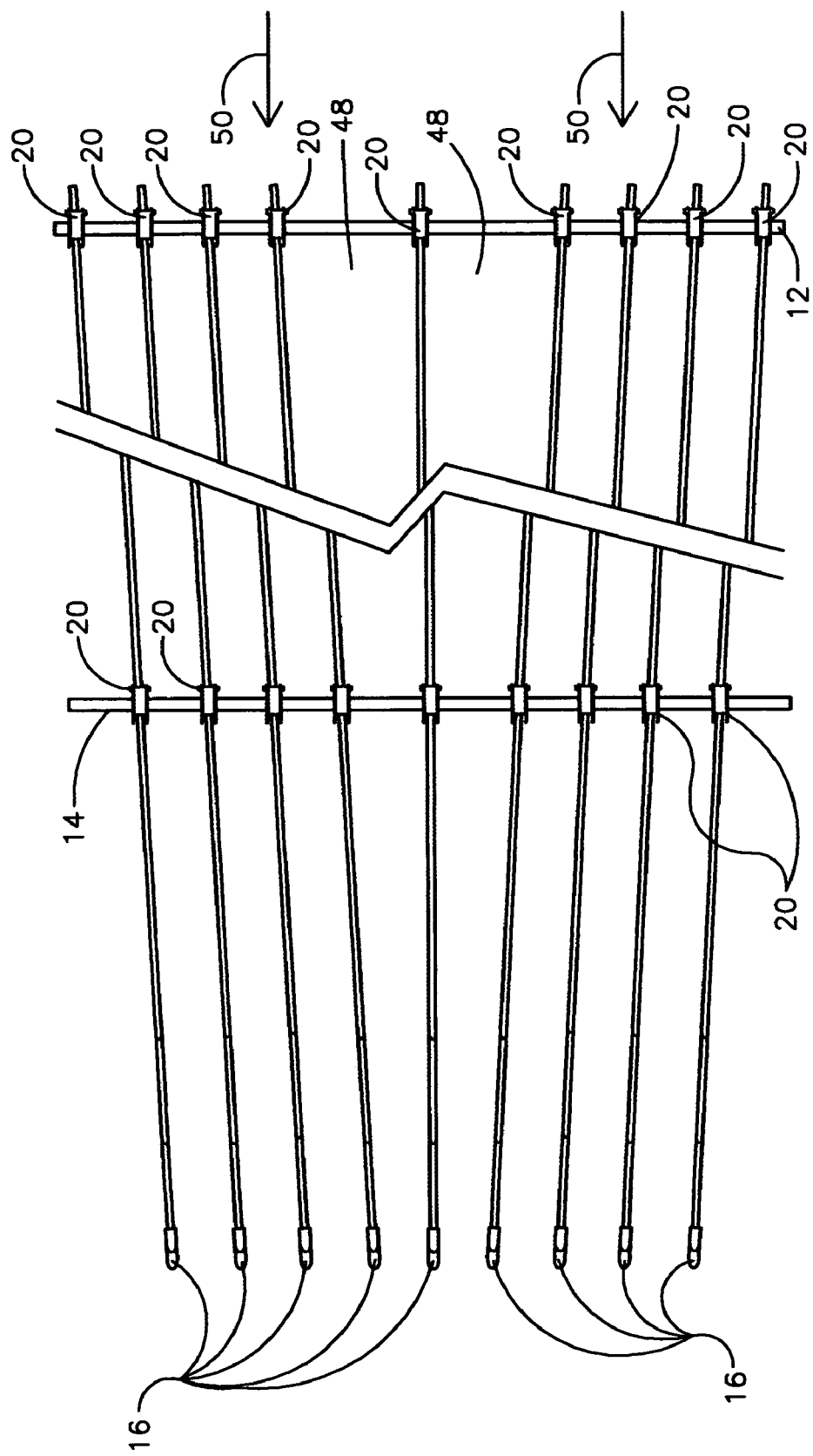
FIG. 3 is a partially phantom top plan view of the lane guide system of the present invention in an alternative position.

As best seen in FIG. 3, adjustment mechanisms 20 comprise an apertured structure, hereinafter a bearing block 36, including an aperture 23 that receives support bars 12 and 14. Sliding or lateral movement of bearing blocks 20 along support bars 12 and 18 is controlled by the operation of attachment mechanisms 20 as described in detail hereinafter.

The most important elements of the lane guide system of the present invention are adjustment mechanisms 20 that allow for rapid and simple adjustment of the position of lane guides 16 along the length of support bars 12 and 14. As best seen from a study of FIGS. 4–7, each of attachment mechanisms 20 comprises pair of opposing wings 28 and 30 each having first and second ends 32 and 34 (see FIGS. 4 and 5). First ends 32 are hingeably joined to a bearing block 36. Wings 28 and 30 also include apertures 38 for receipt and retention of support bars 12 and 14 as described below. Each of bearing blocks 36 contains an aperture 23 for passage of second support bars 12 and 14. As will be apparent to the skilled artisan, apertures 23 and 38 are slightly oversized relative to the diameter of support bars 12 and 14 to permit relative movement of adjustment mechanisms 20 along the length thereof. The sizing of apertures 38 is particularly important in the successful practice of the present invention so that when wings 28 and 30 are compressed as shown in FIG. 5, adjustment mechanisms 20 slide laterally along support bars 12 and 14, but of such a size that when in their flared position (best shown in FIGS. 4 and 6) as driven by the action of spring 40 mounted on opposing pins 41 that extend inwardly between wings 28 and 30 to permit frictional engagement of apertures 38 with second support bars 12 and 14.

According to a preferred embodiment of the present invention depicted in the various Figures, bearing blocks 36 also include vertical apertures 44 for threaded attachment of vertical shafts 46 by means of threads 47. Vertical shafts 46 serve the purpose of placing the adjustment mechanisms 20 and support bars 12 and 14 sufficiently above the surface of what ever conveyor 43 along which product 45 (depicted as a bun in FIG. 2) is moving so that product 45 can flow unimpeded thereunder. As will be apparent to the skilled artisan, attachment of vertical shafts 46 to adjustment mechanisms 20 could be by any number of methods. For example, vertical shafts 46 could be welded to bearing blocks 36, vertical shafts 46 could be equipped at their top extremity with an aperture that engages support bars 12 and 14 etc. The treaded connection of vertical shafts 46 in a cylindrical aperture, as that shown at 44 in the accompanying Figures, provides rigidity to the attachment of vertical shafts 46 to bearing blocks 36 and lane guides 16.

As is best seen in FIG. 3, using the system of the present invention, lane guides 16 can be adjusted to provide differing lanes 48 to guide product entering from the direction of arrows 50 as shown in FIG. 1.

Referring now more specifically to FIGS. 4, 5, 6 and 7 that depict the operation of adjustment mechanisms 20, as best seen in FIGS. 4 and 5, when wings 28 and 30 are flared by the action of spring 40 pushing thereagainst apertures 38 come into frictional engagement with the outer surface 52 of support bars 12 and 14 while in the compressed configuration shown in FIG. 5 the centerlines 54 and 56 of support bars 12 and 14 and apertures 38 respectively are colinear. Compression of wings 28 and 30 as shown in FIGS. 5 and 7 is accomplished by the simple act of squeezing wings 28 and 30 between the thumb and index or other fingers. Thus, the relative positions of bearing blocks 36, attached vertical shafts 46 and lane guides 16 can be adjusted to virtually any position across the width of support bars 12 and 14 to provide a wide variety of lane configurations for the movement of product 45, one of such configurations being depicted in FIG. 3.

While the hinging system 58 that connects wings 28 and 30 to bearing block 36 is not of critical importance to the successful practice of the invention, it will be readily recognized that it should be such that wings 28 and 30 are retained with bearing block 36 and allowed to rotate sufficiently to bring and remove apertures 38 into and out of frictional engagement with support bars 12 and 14 as described above, the arrangement depicted in FIGS. 4, 5, 6 and 7 is one that is fully satisfactory. In this arrangement, first ends 32 are inserted through slots 60 in bearing block 36 and retained therein by the engagement of apertures 38 and 23. The skilled artisan can easily envision a number of variants for the successful design of a hinging arrangement for device of the present invention.

There has thus been described a readily and easily hand adjustable lane guide system that requires no tools to obtain lane change orientation and which is fast, thus reducing lane change downtime to a minimum.

As the invention has been described, it will be apparent to those skilled in the art that the same may be varied in many ways without departing from the spirit and scope of the invention. Any and all such modifications are intended to be included within the scope of the appended claims.

What is claimed is:

1. A conveyor system comprising:
   A) a continuous conveyor having an upper surface; and
   B) an adjustable lane guide system mounted above the contiuous conveyor said adjustable lane guide system comprising:
      i) first and second generally parallel and spaced apart support bars;
      ii) a plurality of lane guides generally perpendicular to the support bars; and
      iii) a plurality of adjustable attachment mechanisms joining the lane guides to the first and second support bars; each of the adjustable attachment mechanisms comprising:
         a) a bearing block that engages the support bars via a bearing block aperture therein;
         c) a pair of opposing wings on either side of the bearing block engaging the support bars by virtue of wing apertures therein and each having first and second ends, the first ends hingeably attached to the bearing block and the second ends flared by a spring located between the pair of opposed wings so that the wing apertures frictionally engage the support bars in the flared position and such that opposing pressure applied to each of the second ends causes the wings to be drawn toward each other against the pressure of the spring thereby causing alignment of the wing apertures with the support bars and allowing the adjustment mechanisms to move laterally along the support bar so that the distance between adjacent lane guides can be changed along the first and second support bars.

2. The conveyor system of claim 1 wherein the bearing block further includes a cylindrical aperture at right angles to the bearing block aperture that engages the support bars for the attachment of a shaft that connects the bearing blocks to the lane guides.

3. The conveyor system of claim 2 wherein the shaft is connected to the cylindrical aperture by threads on the shaft and on the interior of the cylindrical aperture.

4. The conveyor system of claim 1 wherein the spring is retained between the wings by a pair of opposing pins extending inwardly from each of the wings.

5. The conveyor system of claim 1 wherein the hingeable attachment of the opposing wings to the bearing block comprises the insertion of the first ends into slots in the bearing block.

* * * * *